(12) United States Patent
Van Walraven et al.

(10) Patent No.: US 8,096,017 B2
(45) Date of Patent: Jan. 17, 2012

(54) GROMMET FOR METAL STUD

(75) Inventors: Jan Van Walraven, Mijdrecht (NL); Marek Juzak, Mijdrecht (NL)

(73) Assignee: J. Van Walraven Holding BV, Mijdrecht (NL)

( * ) Notice: Subject to any disclaimer, the term of this patent is extended or adjusted under 35 U.S.C. 154(b) by 385 days.

(21) Appl. No.: 12/259,093

(22) Filed: Oct. 27, 2008

(65) Prior Publication Data

US 2010/0101045 A1   Apr. 29, 2010

(51) Int. Cl.
*F16L 5/00* (2006.01)
(52) U.S. Cl. .......................................................... 16/2.1
(58) Field of Classification Search ............... 16/2.1, 16/2.2; 411/508, 509, 913; 174/67, 152 R, 174/152 G, 153 R, 153 G; 24/713.6
See application file for complete search history.

(56) References Cited

U.S. PATENT DOCUMENTS

| | | | | | |
|---|---|---|---|---|---|
| 3,385,158 A | * | 5/1968 | Morin | .............................. | 411/45 |
| 4,621,961 A | * | 11/1986 | Gulistan | ........................ | 411/352 |
| 4,732,519 A | * | 3/1988 | Wagner | .......................... | 411/337 |
| 5,069,586 A | * | 12/1991 | Casey | ............................ | 411/339 |
| 5,144,777 A | * | 9/1992 | Fishel et al. | ..................... | 52/144 |
| 5,647,107 A | * | 7/1997 | Brewster | ....................... | 24/713.6 |
| 5,735,021 A | * | 4/1998 | Briggs | ............................. | 16/369 |
| 5,765,819 A | * | 6/1998 | Hummel | ........................ | 267/153 |
| 5,806,139 A | * | 9/1998 | Anderson et al. | ................ | 16/2.1 |
| 6,374,455 B1 | * | 4/2002 | Regele et al. | ..................... | 16/2.1 |

* cited by examiner

*Primary Examiner* — Chuck Y. Mah
(74) *Attorney, Agent, or Firm* — Browdy and Neimark, PLLC

(57) ABSTRACT

A grommet for a hole in a metal stud includes a plastic sleeve having a radial flange, and a vibration isolating body having a substantially cylindrical portion having on one of its ends a radial flange and on the other end one or more flange sections, such flange section being adapted to be passed through the hole in the stud when the flange of the vibration isolating body is brought in engagement with the stud, and the sleeve being adapted to be inserted into the substantially cylindrical portion of the vibration isolating body beyond the flange section until the radial flange of the plastic sleeve engages the isolating ring, whereby the radial flange sections are locked in an outward position and the edge of the hole in the stud is at least partially locked between the two flanges, thus fixing the grommet in the hole.

4 Claims, 3 Drawing Sheets

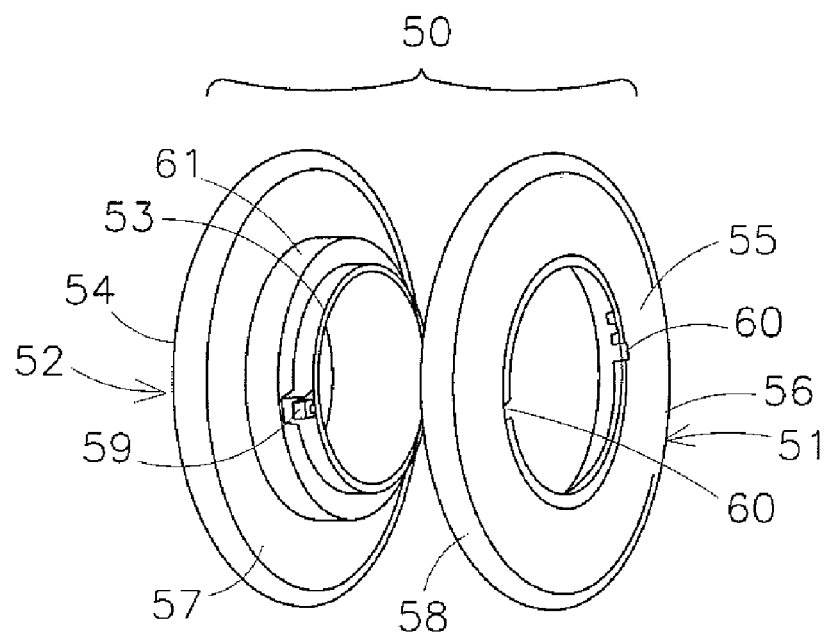
Fig 5
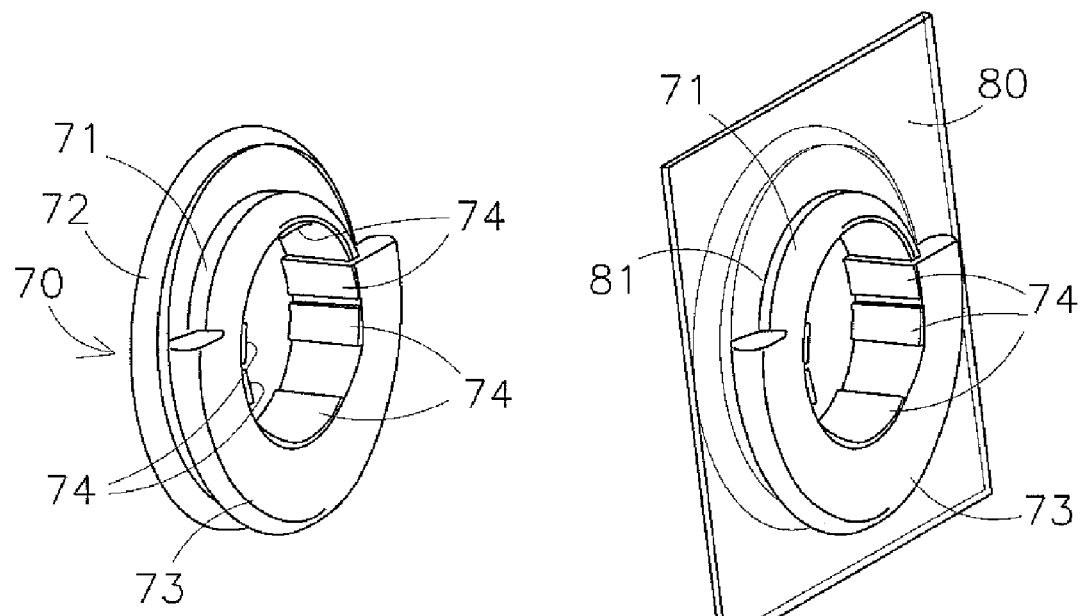
Fig 6
Fig 7

GROMMET FOR METAL STUD

FIELD OF THE INVENTION

The present invention relates in general to a grommet for a metal stud. In particular the present invention relates to grommets for guiding pipes, in particular plastic pipes, through the holes in the studs.

BACKGROUND OF THE INVENTION

Metal studs are often used for frame structures of e.g. separation walls or so called dry walls. The metal studs are provided with punched holes in their web for passing through pipes, wiring, cabling and the like. Grommets are provided to be placed in the stud holes to guide the pipes, wiring, cabling and the like through said holes in the stud and to protect them from damage by the edge of the holes.

There are known grommets which snap into a punched hole and are sized to fit the hole. These grommets have a cylindrical body with a flange on one end and spring snaps on the body, such that the body can be inserted in the stud hole and the edge of said hole snaps behind the spring snaps to be caught between the flange and the spring snaps.

U.S. Pat. No. 5,537,714 shows a plastic grommet for use on metal studs in a wall construction for protecting cables, conduits or wires. This known grommet has a cylindrical body with a radial flange. On the outer surface of the cylindrical body are provided radially projecting spring snaps The cylindrical body can be fit into a sized hole in the web of the stud such that the flange engages the web of the stud such that the edge of the hole in the web is captured between the spring snaps and the flange. This particular grommet also has spring fingers on the other side of the flange and holes in the flange which allows to join the grommet to a same grommet flange-to-flange. The two grommets thus assembled on opposite sides of a rectangular or other irregular or pre-punched hole in the stud web capture the web between the flanges. This known plastic grommet is suitable for guiding relatively long pipes through the holes in the studs of a wall construction. However, it has as a disadvantage that vibrations in the installed pipes are transferred into the studs via the grommets.

U.S. Pat. No. 4,656,689 discloses a grommet which is particularly developed for passing conduits of automotive air conditioning systems through a firewall which separates the engine compartment and the passenger compartment of the vehicle. This known grommet is for protecting a conduit passing through a wall opening and for providing an air seal between the conduit and the edges of the wall around the wall opening. The grommet has a relatively stiff fastener portion with a washer shaped base portion having a centrally located circular opening. The fastener portion has projections extending from the base portion and locking devices at the ends of the projections for engaging the edges of the wall around the wall opening. The grommet furthermore has an elastomeric seal portion, which has a pan and a flange, said pan having a central aperture of smaller dimension than the outside dimension of the conduit, whereby a seal around the perimeter of said conduit is formed when said conduit is passed through said aperture. When installed, the pan extends through the central opening in the base portion of the fastener portion and through the opening in the wall. The flange of the elastomeric seal portion has openings which receive the projections of the fastener portion. When installed the flange of the elastomeric seal portion is located between the wall and the base portion of the fastener portion. It is to be expected that the elastomeric part isolates vibrations in the conduit. However, this grommet is not suitable for passing through long lengths of pipe in a wall construction, because the elastomeric part would engage directly and narrowly on the pipe, which hampers passing the pipe through the grommet. This disadvantage becomes even more apparent when the pipe has to be guided through a number of grommets in a wall structure which in practise will be the case.

U.S. Pat. No. 5,765,819 discloses a vibration isolating grommet comprising a metal flanged cylindrical sleeve and an annular elastomeric element having a cylindrical portion and a flange section. On the end of the cylindrical portion of the elastomeric element an axially extending portion is provided with a relatively large radially inwardly extending truncated conical lip at the extremity thereof. By insertion of the metal sleeve in the elastomeric element and axially advancing the metal sleeve, radially outward movement of the conical portion of the elastomeric element is effected. Thereby, when the grommet is inserted in an aperture in a work piece, the outwardly moved conical portion underlies a bottom surface of the workpiece (plate) to retain the grommet in the aperture in a pre-assembly state. The inside diameter of the sleeve is sized to freely accept a mounting fastener, e.g. a bolt The head of the bolt rests on the flange of the metal sleeve. By tensioning the fastening element with regard to a support structure the flange section elastomeric element is compressed between the flange of the metal sleeve and the workpiece. The other end of the metal sleeve abuts the support structure thereby limiting the compression of the flange section of the elastomeric element. This known grommet is typically designed for passing through fastening elements such that a workpiece can be mounted to a support in a vibration isolated manner. Although the grommet can be retained in a pre-assembly state in an aperture in a workpiece, it is not suitable for passing through pipes since the retaining force of the elastomeric lips is not sufficient to withstand the forces when long pieces of pipe are passed through the grommet Furthermore the known grommet will only be retained in a sized aperture which is closely adapted to the size of the grommet.

The present invention has for an object to provide a grommet for a hole in a metal stud which provides isolation of vibrations from the pipes to a stud of a wall structure Another object is to provide a grommet which allows to apply the grommet with studs with differently shaped and sized apertures.

Yet another object of the invention is to provide a grommet which allows low friction sliding of pipes through the grommet.

SUMMARY OF THE INVENTION

According to one aspect of the invention a grommet is provided for a hole in a metal stud comprising a plastic sleeve having a radial flange, and further comprising a vibration isolating body having a substantially cylindrical portion having on one end a radial flange and on another end one or more flange sections. Said flange sections are adapted to be passed through the hole in the stud when said flange of the vibration isolating body is brought in engagement with the stud. Said plastic sleeve is inserted into the substantially cylindrical portion of the vibration isolating body beyond the flange sections until said radial flange of the sleeve engages the isolating ring, whereby the radial flange sections are retained in an outward position. The edge of said hole in the stud is then at least partially locked between the two flanges, thereby fixing the grommet in said hole.

According to another aspect of the invention a grommet is provided for a hole in a metal stud comprising a pair of grommet halves which can be coupled to each other. Each grommet half comprises a substantially ring shaped plastic body with a central passage, as well as a vibration isolating ring with a central opening. The substantially ring shaped plastic body has a radial flange and at least one coupling member, said coupling member having a leg extending substantially perpendicular from the radial flange and having a latch portion provided at the free end of said leg. The vibration isolating ring lies against a side of the radial flange of the ring shaped body which faces the other grommet half. The grommet halves are arranged on opposite sides of the metal stud. The respective vibration isolating rings engage the respective sides of the stud and the legs of the coupling members extend through the hole in the metal stud, through the central opening of the vibration isolating ring and through the central passage in the ring shaped plastic body of the other grommet half. Thereby the latch portions at the free end of the legs of the coupling members engage behind the edge of the central passage of the other grommet half, thus fixing the grommet halves to eachother.

According to yet another aspect of the invention a grommet is provided for a hole in a metal stud comprising a pair of grommet halves which can be coupled to each other. One of the grommet halves comprises a plastic sleeve provided with a radial flange The other grommet half comprises a substantially ring shaped plastic body having a radial flange. Each of the grommet halves comprises a vibration isolating ring that lies against their respective flanges on a side facing the other grommet half and has a central opening. One of the ring shaped body or the sleeve is provided with at least one coupling member and the other of the ring shaped body or the sleeve is provided with at least one coupling recess whereby the grommet halves can be coupled to eachother. The grommet halves are arranged on opposite sides of the metal stud The respective vibration isolating rings engage the respective sides of the stud. The sleeve of one of the grommet halves extends through the hole in the metal stud and through the central passage in the ring shaped body of the other grommet half, whereby said at least one coupling member engages with said at least one coupling recess so as to couple both grommet halves.

According to still another aspect of the invention a grommet is provided for a hole in a metal stud comprising a bush of vibration isolating material. The vibration isolating bush has on either end a radial flange. The grommet furthermore comprises one or more plastic lining elements provided on an inner side of the vibration isolating bush. One flange of the vibration isolating bush of the grommet is passed through the hole in the metal stud such that it engages behind the edge of said hole and the edge of said hole is at least partially locked between the two flanges, thereby fixing the grommet in said hole.

BRIEF DESCRIPTION OF THE DRAWINGS

FIG. 5 shows in a perspective view a grommet according to a third aspect of the invention in a disassembled state;

FIG. 6 shows in a perspective view a grommet according to a fourth aspect of the invention;

FIG. 7 shows in a perspective view the grommet of FIG. 6 which is installed in a hole in a metal stud.

DETAILED DESCRIPTION OF THE INVENTION

Figures 1, 2:
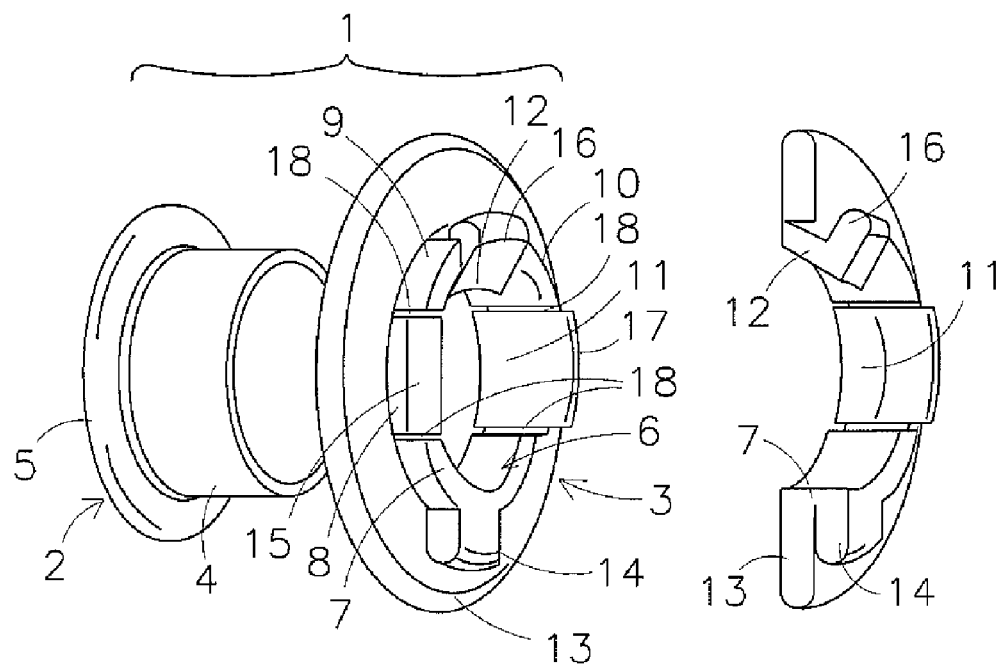
FIG. 1 shows in a perspective view a grommet according to a first aspect of the invention in a disassembled state.
FIG. 2 shows in a perspective view a sectioned vibration isolating body of the grommet shown in FIG. 1.

In FIG. 1 a grommet 1 is shown for a hole in a metal stud. The grommet 1 comprises a plastic part 2 and an elastomeric part 3. The plastic part 2 is a sleeve which has a substantially cylindrical body 4. At one end of the cylindrical body is provided a radial extending flange 5.

The elastomeric part has a substantially cylindrical portion 6. The cylindrical portion 6 of the vibration isolating element comprises a plurality of cylinder segments 7-12, which are spaced apart by axial slits 18. The cylinder segments 7-12 are connected on one end with a radial flange 13. On the other end of the cylinder segments 7, 8, 11 and 12 are provided radial flange sections 14, 15, 16 and 17 respectively. The flange sections 14-17 are adapted to be passed through the hole in the stud when said flange 13 of the elastomeric part 3 is brought in engagement with the stud. Three of the cylinder segments having a flange section, i.e. cylinder segments 8, 11 and 12 are in an unloaded state extending in an inclined fashion radially inwardly as can be best seen for cylinder segment 12 in the sectional view of FIG. 2. Upon insertion of the cylindrical body 4 of the sleeve in the cylindrical portion 6 of the elastomeric part, the inclined cylinder segments 8, 11 and 12 are pushed outwardly.

Figure 8A:
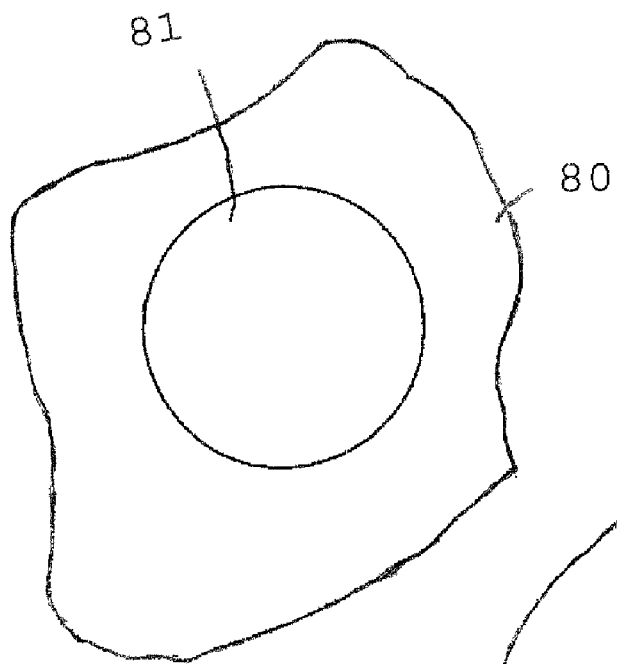
FIG. 8A and FIG. 8B show the shape of holes which may be provided in the metal stud.
Figure 8B:
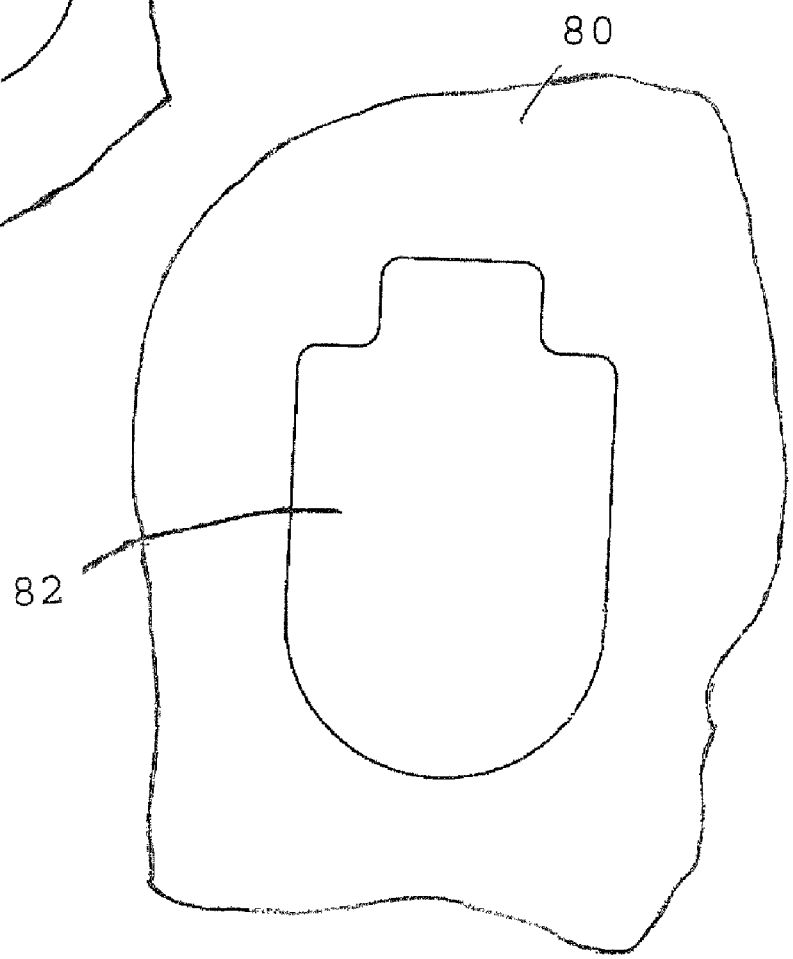

The grommet 1 can be installed in a hole in a stud 80 which hole may be shaped as the holes 81 and 82 as shown in FIGS. 8A and 8B, but also other hole shapes are possible. When the grommet 1 is installed, the elastomeric part is inserted with the cylinder segments 11-18 into the hole in the stud and is tilted or slided such that the lower flange section 14 engages behind the lower edge of the hole. The inclined cylinder segments 8, 11, 12 allow easy insertion of the cylindrical portion 6 into the hole Next the cylindrical plastic body 4 is inserted into the cylindrical portion 6 of the elastomeric part 3 beyond the flange sections 14-17 until the radial flange 5 of the cylindrical plastic body 4 engages the flange 13 of the elastomeric part. The flange 13 may be provided with ribs or the like on the side that engages the stud, to enhance the vibration isolation. The inclined cylinder segments 8, 11 and 12 are pushed outwardly by the cylinder body 4, and the corresponding flange section 15, 16, 17 engages behind the edge of the hole in the stud. The radial flange sections 15, 16, and 17 are locked in an outward position by the cylinder body 4 and the edge of said hole in the stud is at least partially locked between the flange 13 and the flange sections 14-17.

The grommet 1 is securely retained in said hole after which a pipe can be passed through the cylindrical body 4 of the plastic part 2. The plastic part 2 has relatively low friction with respect to the pipe to be passed through it. The pipe is preferably made of plastics material. The elastomeric part 3 serves as a vibration isolating body which prevents the plastic part to be in direct contact with the metal stud and thereby prevents vibrations to be passed on from the installed pipe to the stud and further into the wall frame structure.

Figures 3, 4:
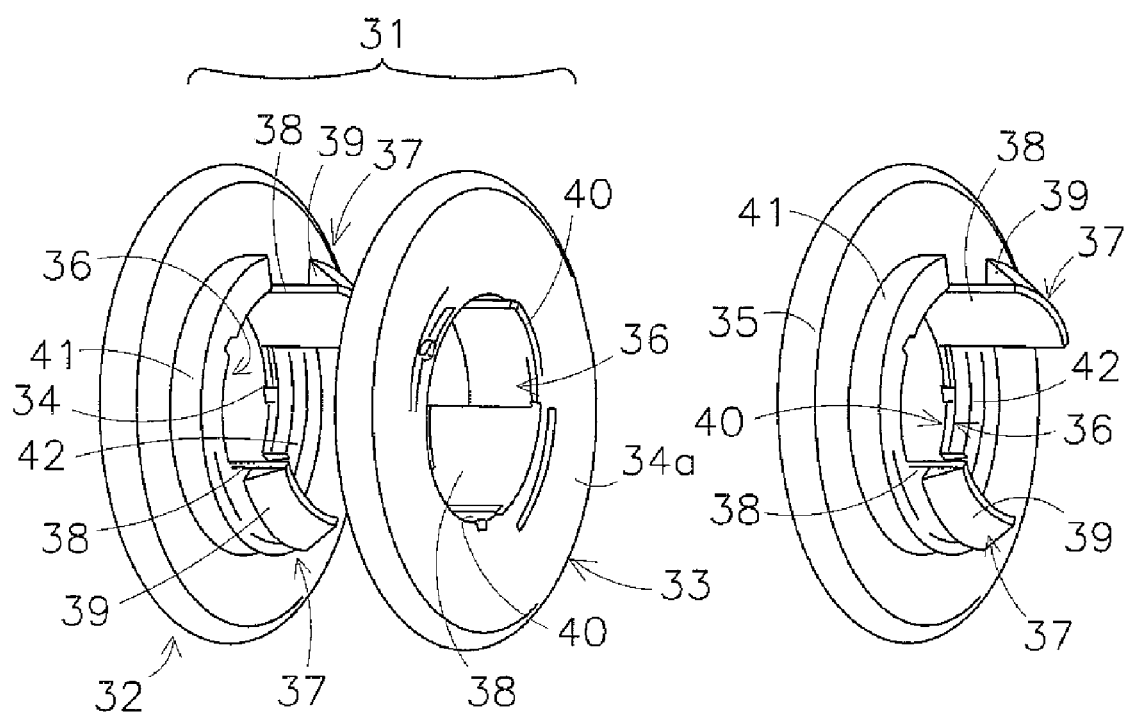
FIG. 3 shows in a perspective view a grommet according to a second aspect of the invention in a disassembled state.
FIG. 4 shows in a perspective view a grommet half of the grommet shown in FIG. 3.

In FIG. 3 is shown a grommet 31 for a hole in a metal stud. The grommet 31 comprises a pair of grommet halves 32 and 33 which can be coupled to each other.

Each of the grommet halves 32, 33 comprises a plastic body 34. The plastic body 34 has on one end a radial flange 34a and two opposed coupling members 37. The coupling members each have a leg 38 extending substantially perpendicular from the radial flange 34a and having a latch portion 39 provided at the free end of the corresponding leg 38. Thereby the plastic body 34 is substantially shaped as a washer ring with a central passage 36 and coupling members extending therefrom. The legs 38 of the coupling members 37 are shaped as cylinder segments.

The plastic body 34 is provided with two diametrically opposed recesses 40 at the central passage 36 in which, in the coupled state, the legs 38 of the coupling member 37 of the other grommet half 32, 33 is accomodated. When the leg of the coupling member 32, 33 is received in the recess 40 the inner side of the leg 38 is flush with said central passage 36 of washer shaped plastic body 34.

The grommet halves 32, 33 also each comprise a vibration isolating elastomeric ring 35 which is substantially washer shaped with a central opening 36. The elastomeric ring 35 lies against that side of the radial flange 34a of the plastic body 34 which faces the other grommet half 32, 33.

The grommet halves 32, 33 are adapted to be arranged on opposite sides of a metal stud such that the respective elastomeric rings engage the respective sides of the stud. At the side of the elastomeric ring 35 that engages the stud ribs may be provided to enhance the vibration isolation. The legs 38 of the coupling members 37 extend through the hole in the metal stud. The legs 38 furthermore extend through the central opening of the elastomeric ring and through the central passage in the plastic body 34 of the other grommet half 32, 33. The latch portions 39 at the free end of the legs 38 of the coupling members 37 engage behind the edge of the central passage 36 of the other grommet half 32, 33. The cylinder segment shaped legs 38 of the coupling members 37, when the grommet halves 32, 33 are coupled to each other, form a cylindrical guiding sleeve of plastic material. This has the advantage that a pipe, which is passed in a sliding manner through the grommet 31, will only contact plastic material which provides a reduced friction between the pipe and the grommet 31 when the pipe during installation is sliding through the grommet 31.

It should be noted that although in the preferred embodiment shown in FIG. 3 each grommet half 32, 33 has two diametrically opposed coupling members, it is also conceivable that each of the grommet halves has another number of coupling members with legs formed as cylinder segments, which legs are spaced apart, in such a way that in a coupled state of the grommet halves each of the legs of one grommet half are situated between two legs of the other grommet half. Also in that case the legs altogether constitute a plastic cylindrical guiding sleeve. It is also econceivabel that the legs of the coupling members have another shape than a cylinder segment It for instance possible to design them as segments of a guiding sleeve with a polygonal cross section.

The elastomeric ring 35 of each of the grommet halves 32, 33 has cylinder segment 41 extending over approximately 180° extending concentrically with the central opening in the ring 35. The elastomeric ring 35 of each of the grommet halves also has a recess 42 provided in it, which recess is shaped as circle segment that extends over approximately 180°, such that the free end of the elastomeric cylinder segment 41 of the other grommet half can be received in it. The elastomeric cylinder segment 41 in a mounted state extends through the stud hole. The cylinder segments 41 of the two grommet halves are complementary in the sense that they constitute together, in the coupled state of the grommet halves 32, 33, a cylindrical vibration isolating bush, separating the plastic part 34 from the metal stud.

In FIG. 5 is shown grommet 50 for a hole in a metal stud. This grommet 50 comprises a pair of grommet halves 51, 52 which can be coupled to each other.

The grommet half 52 comprises a plastic sleeve 53 provided on one end with a radial flange 54. The sleeve 53 is substantially cylindrical, but could also have another shape, e g polygonal. The other grommet half 51 comprises a ring shaped plastic body 55 having a radial flange 56, such that the ring shaped plastic body 55 is substantially washer shaped.

The grommet half 52 comprises an elastomeric ring 57 which lies against the flange 54 on a side facing the other grommet half 51. The other grommet half 51 comprises an elastomeric ring 58 which lies against the flange 56 on a side facing the grommet half 52. The elastomeric ring 57 of the grommet half 52 has a bush 61 extending concentrically with the central opening The elastomeric rings 57 and 58 may be provided with ribs at the side that engages the metal stud, which may enhance the vibration isolation. The elastomeric bush 61 extends in a mounted state through the stud hole and abuts the vibration isolating ring 58 of the other grommet half 51. Thus in use the stud is only in contact with elastomeric and thus vibration isolating material of the grommet 50.

The plastic sleeve 53 extends through and beyond the end of the vibration isolating bush 61. The plastic sleeve 53 is provided at the end remote from the flange 54 with two diametrically opposed coupling members 59. The ring shaped plastic body 55 of the other grommet half 51 is provided with two diamerically opposed coupling recesses 60 The coupling members 59 and the coupling recesses 60 are mating such that the grommet halves 51, 51 can be coupled to each other.

In use the grommet halves are adapted to be arranged on opposite sides of the metal stud such that the respective vibration isolating rings 57 and 58 engage the respective sides of the stud and such that the sleeve 53 of the grommet half 52 extends through the hole in the metal stud and through the central passage in the ring shaped body 55 of the other grommet half 51. The coupling members 59 engage with the recesses 60 so as to couple both grommet halves 51, 52. It is is conceivable for those skilled in the art that also another number of coupling members and recesses can be provided in another configuration on the plastic parts of the grommet halves.

Referring to FIG. 6 and FIG. 7 yet another grommet 70 for a hole in a metal stud is shown. This grommet 70 comprises a bush shaped as a hollow substantially cylindrical body 71 of elastomeric material. The bush could instead of cylindrical also have another cross sectional shape, e.g. polygonal. On one end of the cylindrical body 71 is provided a radial extending flange 72 which extends over 360°. At the other end of the cylindrical body 71 is provided a flange 73 which extends over approximately 180°. The flange 73 is adapted to be passed through the hole in a web 80 of a metal stud as is shown in FIG. 7. The flange 73 engages behind the edge of said hole and the edge 81 of said hole is at least partially locked between the two flanges 72 and 73, thereby fixing the grommet 70 in said hole.

On the inner side of the cylindrical body 71 are provided a plurality of plastic lining elements 74. These plastic lining elements 74 can be attached to the elastomeric body by gluing or the like When a pipe is installed, the plastic lining elements provide sliding surfaces for the pipe which is passed through the grommet.

What is claimed is:

1. A grommet for a hole in a metal stud, the grommet comprising a plastic part and an elastomeric part, said elastomeric part comprising a vibration isolating body having a substantially cylindrical portion having on one end a radial flange and on another end one or more flange sections, said flange sections being adapted to be passed through the hole in the stud when said flange of the vibration isolating body is brought in engagement with the stud, said plastic part comprising a sleeve having a radial flange, said sleeve of the plastic part being adapted to be inserted into the substantially cylindrical portion of the vibration isolating body beyond the flange sections of the elastomeric part until said radial flange of the plastic part engages the radial flange of the elastomeric part, whereby the radial flange sections of the elastomeric part are locked in a radially outward position and the edge of said hole in the stud is at least partially locked between the radial flange of the elastomeric part and the flange sections of the elastomeric part, thereby fixing the grommet in said hole.

2. The grommet according to claim 1, wherein said substantially cylindrical portion of the elastomeric part comprises a plurality of spaced apart cylinder segments which are connected on one end with the radial flange of the elastomeric part, and wherein said flange sections are provided at the other end of said cylinder segments.

3. The grommet according to claim 2, wherein at least one of said cylinder segments in an unloaded state, in which the sleeve of the plastic part is not inserted in the substantially cylindrical portion of the elastomeric part, extends from the radial flange of the elastomeric part with a radial inward inclination, said at least one inclined cylinder segment being adapted to be forced outwardly upon insertion of the cylindrical plastic body into the substantially cylindrical portion of the elastomeric part, whereby the flange section associated with said at least one inclined cylinder segment engages behind the edge of the hole in the stud.

4. A grommet for a hole in a metal stud, the grommet comprising a plastic part and an elastomeric part, said elastomeric part comprising a vibration isolating body having a substantially cylindrical portion having on one end a radial flange and on another end one or more flange sections, said flange sections being adapted to be passed through the hole in the stud when said flange of the vibration isolating body is brought in engagement with the stud, wherein said substantially cylindrical portion of the elastomeric part comprises a plurality of spaced apart cylinder segments which are connected on one end with the radial flange of the elastomeric part, and wherein said flange sections are provided at the other end of said cylinder segments, said plastic part comprising a sleeve having a radial flange, said sleeve of the plastic part being adapted to be inserted into the substantially cylindrical portion of the vibration isolating body beyond the flange sections of the elastomeric part until said radial flange of the plastic part engages the radial flange of the elastomeric part, whereby the radial flange sections of the elastomeric part are locked in a radially outward position and the edge of said hole in the stud is at least partially locked between the radial flange of the elastomeric part and the flange sections of the elastomeric part, thereby fixing the grommet in said hole, wherein at least one of said cylinder segments of the elastomeric part, in an unloaded state, in which the sleeve of the plastic part is not inserted in the substantially cylindrical portion of the elastomeric part, extends from the radial flange of the elastomeric part with a radial inward inclination, said at least one inclined cylinder segment being adapted to be forced outwardly upon insertion of the cylindrical plastic body into the substantially cylindrical portion of the elastomeric part, whereby the flange section associated with said at least one inclined cylinder segment engages behind the edge of the hole in the stud.

* * * * *